(12) United States Patent
Graham

(10) Patent No.: US 7,481,927 B2
(45) Date of Patent: Jan. 27, 2009

(54) MANUFACTURE OF CASINGS FOR USE IN THE DESALINATION OF WATER AND THE FILTRATION OF LIQUIDS

(75) Inventor: William Graham, Somerset West (ZA)

(73) Assignee: Grahamtek Technologies Singapore Pte Ltd., Singapore (SG)

( * ) Notice: Subject to any disclaimer, the term of this patent is extended or adjusted under 35 U.S.C. 154(b) by 0 days.

(21) Appl. No.: 11/910,141

(22) PCT Filed: Mar. 6, 2006

(86) PCT No.: PCT/ZA2006/000035

§ 371 (c)(1),
(2), (4) Date: Sep. 28, 2007

(87) PCT Pub. No.: WO2006/105556

PCT Pub. Date: Oct. 5, 2006

(65) Prior Publication Data

US 2008/0190833 A1    Aug. 14, 2008

(30) Foreign Application Priority Data

Mar. 29, 2005    (ZA) ............................... 2005/02474
Apr. 13, 2005    (ZA) ............................... 2005/02964

(51) Int. Cl.
*B01D 61/08*    (2006.01)
*B01D 35/30*    (2006.01)
*B01D 63/10*    (2006.01)
*B01D 63/12*    (2006.01)
*B01D 65/00*    (2006.01)
*B29C 35/08*    (2006.01)

(52) U.S. Cl. ............... 210/232; 210/321.6; 210/321.87; 210/542; 220/319; 220/320; 220/378; 156/172; 156/175; 156/187

(58) Field of Classification Search .................. 210/232, 210/321.6, 321.87, 542; 220/319, 320, 187; 156/172, 175, 187
See application file for complete search history.

(56) References Cited

U.S. PATENT DOCUMENTS 3,281,299 A * 10/1966 Shobert ...................... 156/175

(Continued)

FOREIGN PATENT DOCUMENTS

WO    WO-99/52618    10/1999

(Continued)

*Primary Examiner*—Thomas M Lithgow
(74) *Attorney, Agent, or Firm*—Connolly Bove Lodge & Hutz LLP

(57) ABSTRACT

A cylindrical casing (12) is disclosed which is of glass reinforced plastic and has an end cap at each end thereof. In the drawing the illustrated end cap is designated 42.2. Each end cap has at least one opening (52) therein through which water can flow. The illustrated end cap 42.2 is held in place by a mounting ring (28) embedded in the wall of the casing and encircling the casing internally. An internal groove (32) extends circumferentially of the mounting ring (28). A first locking ring (34) having a peripherally extending external rib (36) is within the ring 28. The rib (36) is in the groove (32). A second locking ring (38) fits into the locking ring (34) to expand it outwardly and press the rib (36) into the groove (32). Stud holes (40) in the end cap (42.2) and in the locking ring (38), receive studs (44) which secure the locking ring (38) to the end cap (42.2).

4 Claims, 4 Drawing Sheets

U.S. PATENT DOCUMENTS

| | | | |
|---|---|---|---|
| 3,629,028 A | * | 12/1971 | McLarty et al. ............. 156/175 |
| 4,548,714 A | * | 10/1985 | Kirwan et al. ............... 210/232 |
| 4,622,143 A | * | 11/1986 | Edwards .................. 210/321.9 |
| 4,632,756 A | * | 12/1986 | Coplan et al. ............ 210/323.2 |
| 4,675,109 A | * | 6/1987 | Applegate et al. ...... 210/321.87 |
| 4,739,899 A | * | 4/1988 | Thompson et al. .......... 220/240 |
| 5,137,631 A | * | 8/1992 | Eckman et al. .......... 210/321.8 |
| 5,595,651 A | * | 1/1997 | Pavel ........................ 210/232 |
| 5,720,411 A | * | 2/1998 | Darby et al. ................ 220/582 |
| 6,074,595 A | * | 6/2000 | Eisberg et al. ............. 264/496 |
| 6,217,773 B1 | | 4/2001 | Graham |
| 2002/0079261 A1 | | 6/2002 | Thomassen |

FOREIGN PATENT DOCUMENTS

| | | |
|---|---|---|
| WO | WO-00/27511 | 5/2000 |

\* cited by examiner

MANUFACTURE OF CASINGS FOR USE IN THE DESALINATION OF WATER AND THE FILTRATION OF LIQUIDS

FIELD OF THE INVENTION

THIS INVENTION relates to the fields of desalination and filtration.

BACKGROUND TO THE INVENTION

In many parts of the world, desalinated sea water and desalinated brack water are the only sources of potable water.

Another source of water which, at the moment, is largely untapped is contaminated water flowing from factories and flowing to sewage treatment works. These two sources are usually, at most, treated to bring the water to what is called "river quality" and this water is then allowed to flow into a river and is hence not available for re-use.

There are various methods of desalination in use and a common one uses semi-permeable material which allows water to pass through but retains any remaining solids and the dissolved solids. Desalination is usually preceded by a filtration step to remove the bulk of the solids.

Such desalinators use what are called "membranes". Each membrane comprises a perforated core tube and a plurality of rectangular leaves which are fixed to, and then wound around, the core tube. Each leaf is closed along three edges and open along the fourth. It is along the fourth edge that the leaf is secured to the core tube. A spacer is provided within each leaf to prevent it collapsing. Spacers are also provided between leaves. Water to be treated flows in the dissolved solids retention passages between the leaves, permeates through the material of the leaves into the permeate passages within the leaves and flows from the permeate passages to the inside of the tube. Brine flows along the membrane from one end to the other, remaining in the retention passages and exits through a brine outlet.

Each membrane is within an elongate cylindrical casing. The pressure within each casing is of the order of 40 to 60 bar or higher. This results in significant forces being applied to the end closures which seal the ends of the casing. Elongate casings of similar form are used to filter liquids and remove solid particles therefrom. The pressure existing in casings used for filtration is generally lower than that used in desalination but nevertheless the forces generated are still capable of dislodging the end closures.

The object of the present invention are to provide an improved casing and an improved method of manufacturing such a casing.

BRIEF DESCRIPTION OF THE INVENTION

According to one aspect of the present invention there is provided a cylindrical casing of glass reinforced plastic having an end cap at each end thereof, the end caps each having at least one opening therein through which water can flow and each end cap being held in place by a mounting ring embedded in the wall of the casing and encircling the casing internally, an internal groove extending circumferentially of the mounting ring, a first locking ring having a peripherally extending external rib, said rib being in said groove, a second locking ring which fits into said first locking ring to expand it outwardly and press said rib into said groove, there being stud holes in said end cap and in said second locking ring, and studs securing the second locking ring to the end cap.

Each first locking ring can comprise a number of arcuate parts which are assembled within the mounting ring to form the first locking ring.

According to a further aspect of the present invention there is provided a method of manufacturing and closing a cylindrical casing which comprises slipping a mounting ring over each end of a rotatable mandrel, winding resin coated glass fibres onto said mandrel to form said casing by rotating the mandrel, the mounting rings being embedded in the casing and each having an internal groove, inserting an end cap into each end of the casing, inserting a first locking ring into each of said mounting rings to trap the end caps, the first locking rings having circumferentially extending ribs which enter the grooves of the mounting rings, inserting a second locking ring into each first locking ring to expand the first locking rings and force said ribs into said grooves, and securing said second locking rings to the end caps by inserting studs through bores in the second locking rings and into tapped bores of the end caps. The method can further comprise assembling a number of arcuate parts within each first locking ring thereby to form the second locking rings.

BRIEF DESCRIPTION OF THE DRAWINGS

For a better understanding of the present invention, and to show how the same may be carried into effect, reference will now be made, by way of a non-limiting example, to the accompanying drawings in which:

FIG. 5 is a section illustrating an assembled end closure.

DETAILED DESCRIPTION OF THE DRAWINGS

Figure 1:
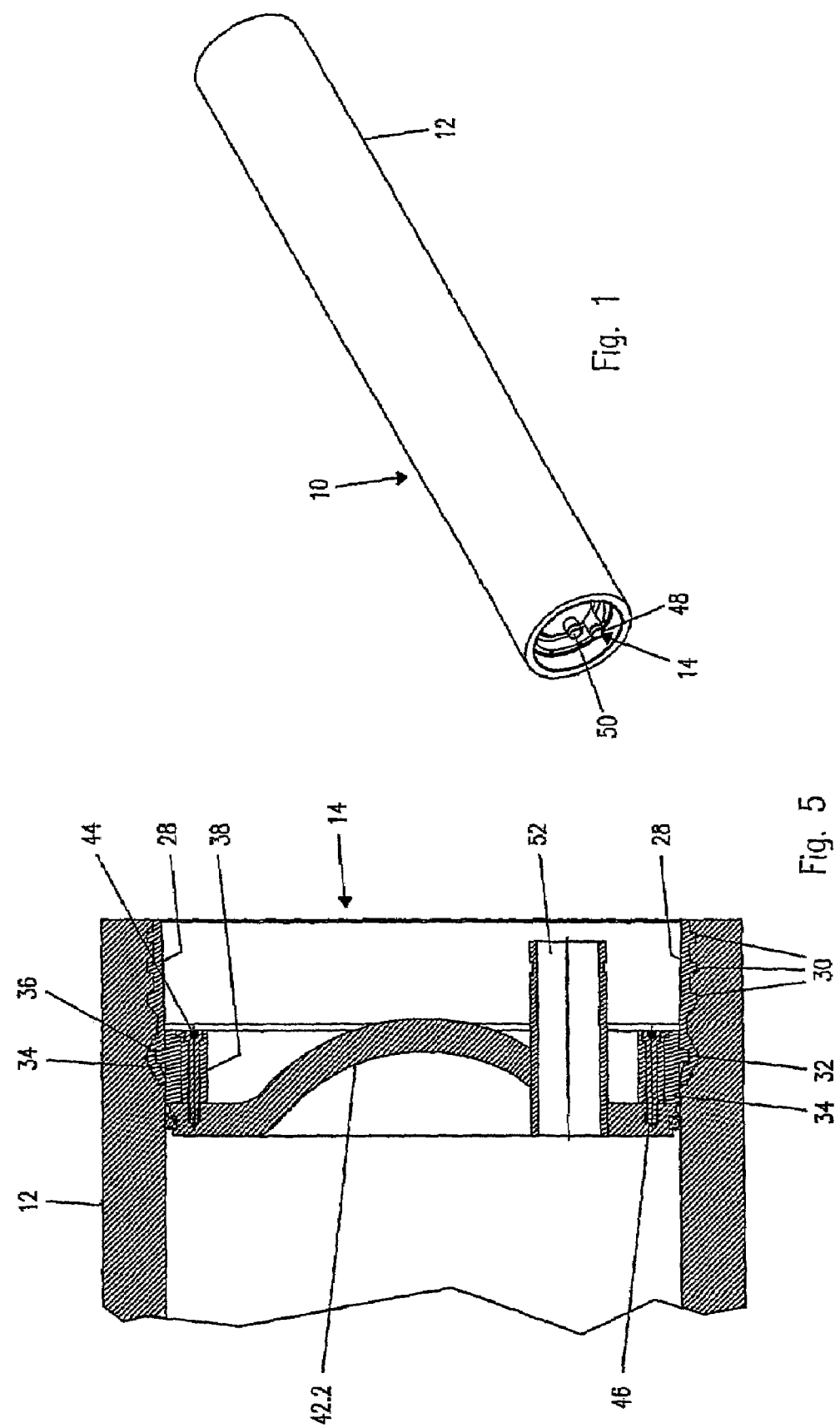
FIG. 1 is a pictorial view of a reverse osmosis water desalination unit including a cylindrical casing.

Referring firstly to FIG. 1, the reverse osmosis desalination unit 10 illustrated comprises a cylindrical casing 12 and end closures 14 only one of which can be seen in FIG. 1. Within the casing 12 (see FIGS. 2 and 3) there are three end-to-end spirally wound reverse osmosis membranes 16.1, 16.2 and 16.3. Such membranes are well known in the art and their construction will not be described in detail herein. For the purposes of the present description it is noted that each membrane 16.1, 16.2 and 16.3 comprises a core tube 18 with leaves 20 of semi-permeable material wound around them.

Upstream of each membrane 16 there is a flow distributor plate 22. The plates 22 are described more fully in specification WO 97/21630. Two short tubes 24 connect the three core tubes 18 end-to-end so that water that has permeated through the semi-permeable material of the leaves 20 can flow to the outlet end of the core tube of the membrane 16.1. A plug 26 closes that end of the core tube 18 of the membrane 16.3 which is remote from the tube 24 that connects the core tube of the membrane 16.3 to the core tube of the membrane 16.2.

To manufacture a casing 12, the two components of a settable resin are mixed. The resin mixture must be such that it can be sprayed, painted or otherwise applied to the surface of the mandrel to form a layer. The resin, once set, must have some resilience so that it can stretch in the direction of the length of the casing and must also have memory so that, after stretching, it returns to its original length.

Rovings of glass fibre are unwound from one or more reels, passed through a resin bath, and then through scrapers to remove excess resin. The bath and scrapers constitute a winding head (not shown). The free ends of the rovings are pressed against the tacky resin layer on the mandrel so that they stick. The mandrel is then rotated to pull the rovings from the reels and simultaneously the winding head reciprocates back and forth along the mandrel so that the rovings are applied the full length of the mandrel.

Once part of the thickness of the casing has been wound, using the resin coated rovings, electrical coils (not shown) are wound onto the part formed casing. Winding using the resin covered rovings then continues. The electrical coils are thus embedded in the walling of the casing. The function of these are is described in specification WO 98/30501.

Once the casing has the requisite wall thickness, it is covered externally using a gel coat, to obtain the requisite surface finish.

Suitable materials for the casing are:—
The internal layer (liner) URCO/6414 A+B
Rovings DR 2400tex
Resin SP4578 Hardener SP4578-1

Figure 3:
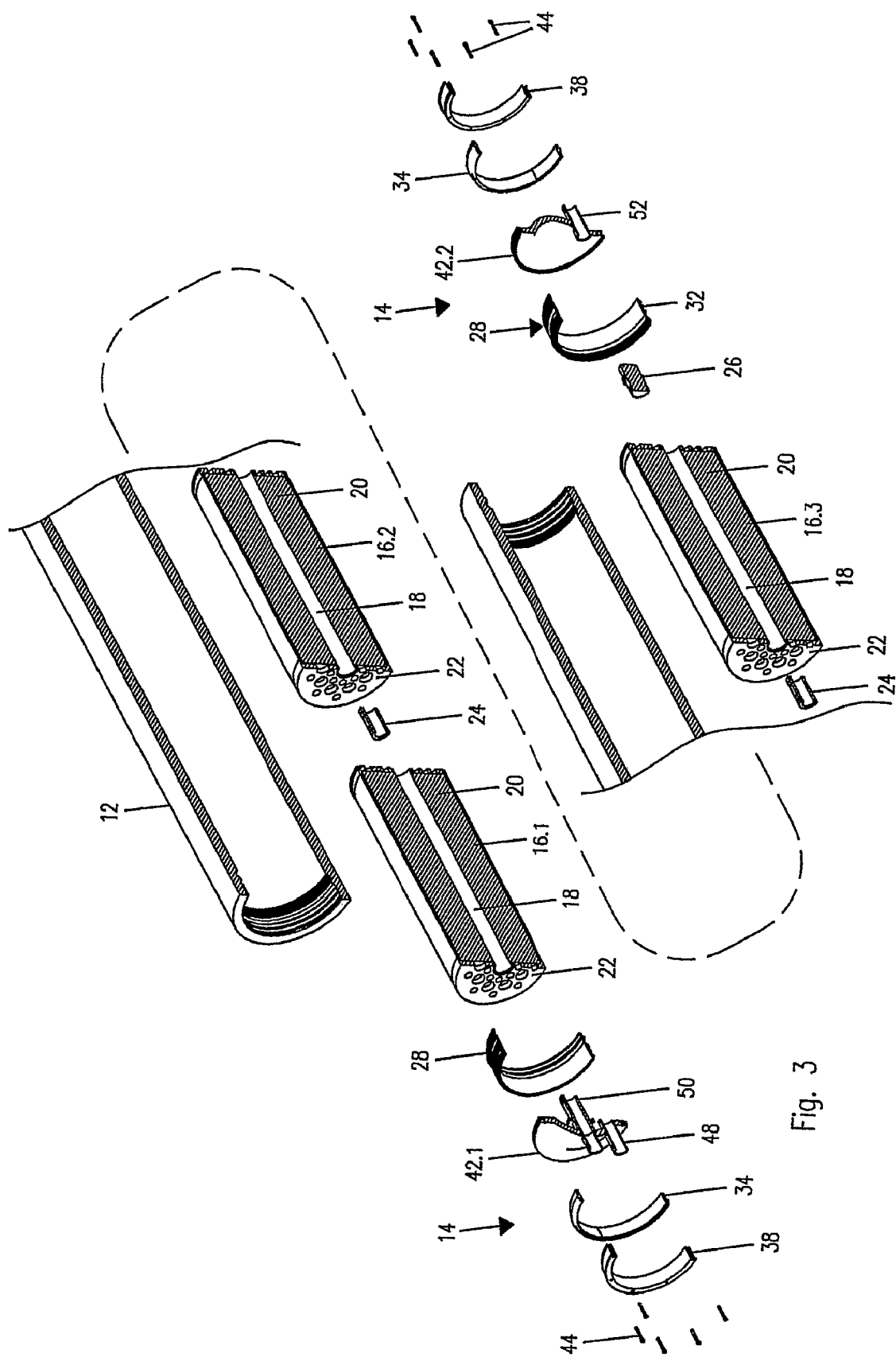
FIG. 3 is an "extended" pictorial view, to a larger scale and also in section, of the unit of FIG. 1.
Figure 4:
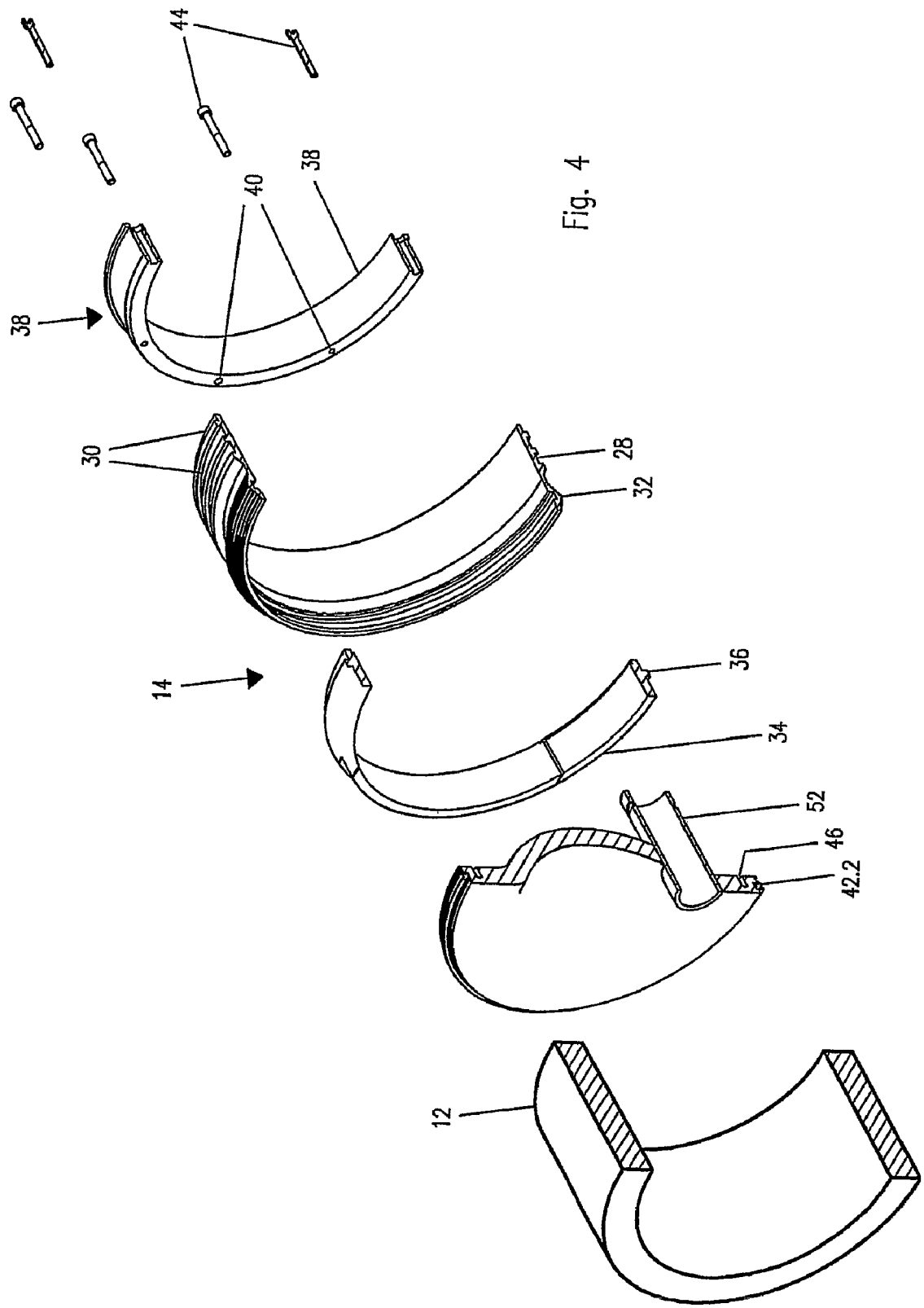
FIG. 4 is a pictorial "exploded" view of the components which form an end closure.

Two rings 28, each with a number of circumferentially extending external flanges 30 (see FIGS. 4 and 5), are slid one onto each end of the mandrel before winding starts. The resilient layer extends from one ring to the other. The rings 28 are embedded in the ends of the casing 12 as winding proceeds. Because of the flanges 30, the rings 28 are interlocked with the glass fibre reinforced material of the casing and are immovable with respect to it. In FIGS. 3 and 4 the rings 28 are shown separated from the casing 12. The "imprint" of each ring 28 is shown withing the casing 12.

Each ring 28 also has an internal circumferentially extending groove 32. (See particularly FIG. 4).

A multi-part ring 34 (also best shown in FIG. 4) is fitted into each ring 28. Each ring 34 comprises three or four arcuate parts and the rings 34 are assembled within the rings 28. Each part of each ring 34 has an external rib extending from end-to-end. The part ribs co-operate when the ring 34 is assembled to form a circumferentially extending rib 36 which interlocks with the groove 32 of the ring 28.

A further ring 38 fits inside each ring 34. The ring 38 has bores axially extending 40 through it at intervals around its circumference.

Dome-shaped end caps 42.1, 42.2 are secured by studs 44 to the rings 38, the studs 44 passing through the bores 40 and being screwed into tapped blind bores 46 (FIGS. 4 and 5) of the end caps 42.1, 42.2. The end cap 42.1 has two pipes 48 and 50 passing through it and the other end cap 42.2 has a single pipe 52 passing through it.

The order of assembly of the components of the end closure shown in FIGS. 4 and 5 is as follows. The end cap 42.2 is inserted into the end of the casing 12 and passes through the embedded ring 28. The ring 34 is then assembled inside the embedded ring 28 so that the rib 36 interlocks with the groove 32 and traps the end cap 42.2. The ring 38 is then inserted into the assembled ring 34 and the studs 44 passed through the ring 38 and screwed into the blind tapped bores 46 of the end cap 42.2. The ring 38 expands the ring 34 and forces the rib 36 into the groove 32.

Figure 2:
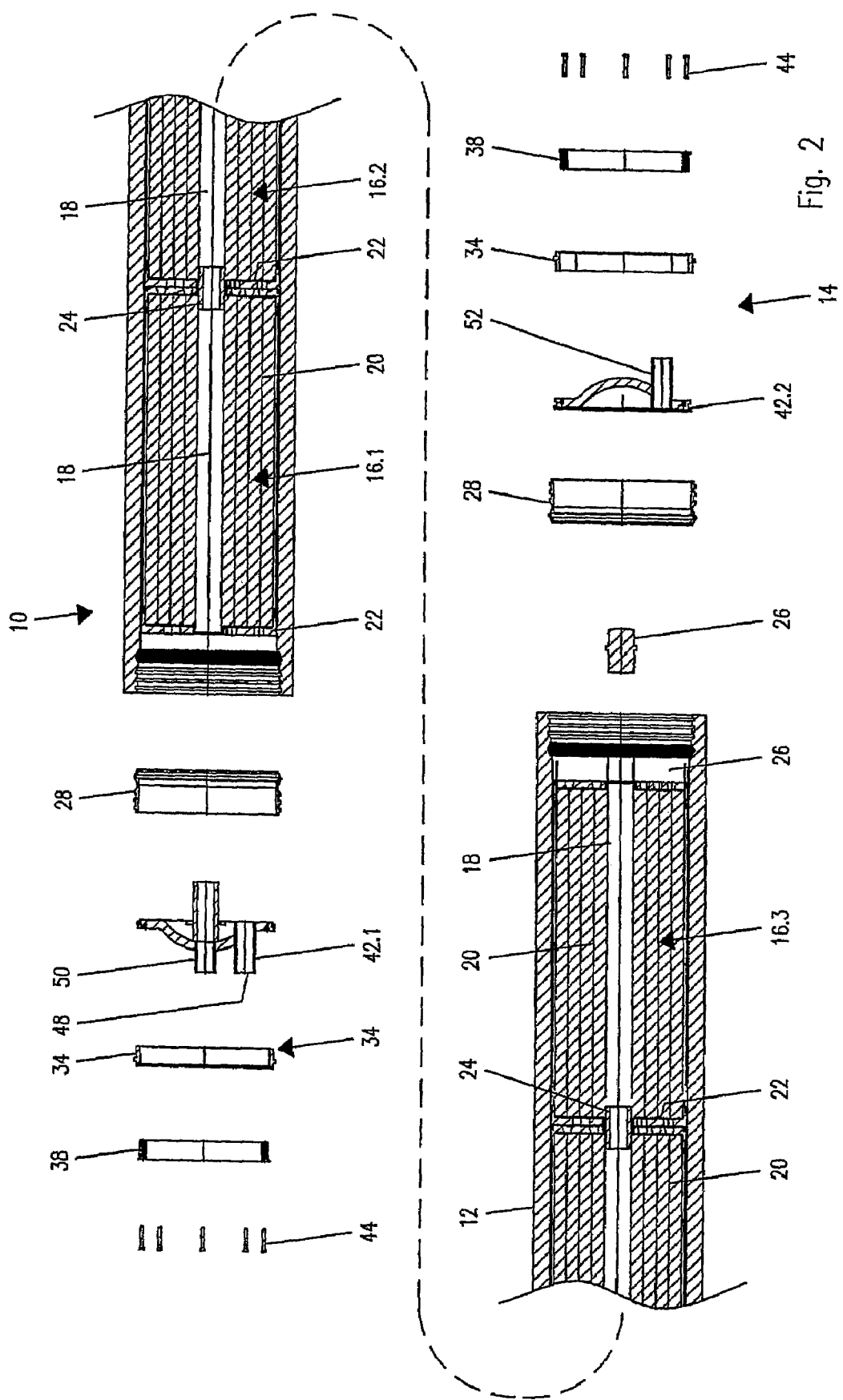
FIG. 2 is a longitudinal, diametrical section through the unit of FIG. 1 and showing some of the components separated for ease of illustration.

Water to be desalinated enters via the pipe 48 and flows into the space upstream of the left hand plate 22 as viewed in FIG. 2. The water which emerges from the salt retention passages of the membrane 16.1 flows through the centre one of the plates 22 and into the membrane 16.2, and thereafter to the membrane 16.3. Brine emerges through the pipe 52 and permeated water emerges through the pipe 50.

The invention claimed is:

1. A cylindrical casing of glass reinforced plastic having an end cap at each end thereof, the end caps each having at least one opening therein through which water can flow and each end cap being held in place by a mounting ring embedded in the wall of the casing and encircling the casing internally, an internal groove extending circumferentially of the mounting ring, a first locking ring having a peripherally extending external rib, said rib being in said groove, a second locking ring which fits into said first locking ring to expand it outwardly and press said rib into said groove, there being stud holes in said end cap and in said second locking ring, and studs securing the second locking ring to the end cap.

2. A casing as claimed in claim 1, wherein the first locking ring comprises a number of arcuate parts which are assembled within the mounting ring to form the first locking ring.

3. A method of manufacturing and closing a cylindrical casing which comprises slipping a mounting ring over each end of a rotatable mandrel, winding resin coated glass fibres onto said mandrel to form said casing by rotating the mandrel, the mounting rings being embedded in the casing and each having an internal groove, inserting an end cap into each end of the casing, inserting a first locking ring into each of said mounting rings to trap the end caps, the first locking rings having circumferentially extending ribs which enter the grooves of the mounting rings, inserting a second locking ring into each first locking ring to expand the first locking rings and force said ribs into said grooves, and securing said second locking rings to the end caps by inserting studs through bores in the second locking rings and into tapped bores of the end caps.

4. A method as claimed in claim 3, and comprising assembling a number of arcuate parts within each first locking ring thereby to form the second locking rings.

\* \* \* \* \*